United States Patent
Zhadanov et al.

(10) Patent No.: US 8,474,768 B2
(45) Date of Patent: Jul. 2, 2013

(54) DEVICE FOR SUPPORTING A PART

(71) Applicants: Eli Zhadanov, Brooklyn, NY (US); Sam Zhadanov, Brooklyn, NY (US)

(72) Inventors: Eli Zhadanov, Brooklyn, NY (US); Sam Zhadanov, Brooklyn, NY (US)

(*) Notice: Subject to any disclaimer, the term of this patent is extended or adjusted under 35 U.S.C. 154(b) by 0 days.

(21) Appl. No.: 13/689,118

(22) Filed: Nov. 29, 2012

(65) Prior Publication Data

US 2013/0087667 A1    Apr. 11, 2013

Related U.S. Application Data

(63) Continuation-in-part of application No. 12/800,406, filed on May 15, 2010.

(51) Int. Cl.
  *A47G 1/17* (2006.01)
(52) U.S. Cl.
  USPC ............ 248/205.4; 248/205.5; 248/206.3; 248/206.2
(58) Field of Classification Search
  USPC ........ 248/205.5, 206.3, 304, 206.2; D14/203, D14/253; D6/526
  See application file for complete search history.

(56) References Cited

U.S. PATENT DOCUMENTS

| | | | | |
|---|---|---|---|---|
| 3,797,717 A * | 3/1974 | Collins | | 224/231 |
| 4,696,447 A * | 9/1987 | Strecker | | 248/206.3 |
| 4,924,597 A * | 5/1990 | Tursi | | 33/758 |
| 5,054,170 A * | 10/1991 | Otrusina | | 24/580.11 |
| D329,192 S * | 9/1992 | Susac | | D8/349 |
| 5,433,416 A * | 7/1995 | Johnson | | 248/475.1 |
| 5,435,511 A * | 7/1995 | Hsu | | 248/206.3 |
| 5,553,908 A * | 9/1996 | Shink | | 296/97.8 |
| 5,673,884 A * | 10/1997 | Yemini | | 248/205.5 |
| 5,850,996 A * | 12/1998 | Liang | | 248/221.11 |
| D404,038 S * | 1/1999 | Fransson et al. | | D14/253 |
| 5,893,543 A * | 4/1999 | Emery et al. | | 248/205.5 |
| D438,536 S * | 3/2001 | Willison et al. | | D14/253 |
| 6,330,948 B1 * | 12/2001 | Leto | | 211/70.6 |
| 6,375,143 B1 * | 4/2002 | Burns | | 248/363 |
| 6,402,104 B1 * | 6/2002 | Smith | | 248/205.5 |
| D464,222 S * | 10/2002 | Coffin et al. | | D6/526 |
| 6,481,684 B1 * | 11/2002 | Farmer et al. | | 248/309.3 |
| 6,658,775 B1 * | 12/2003 | Lanzisero | | 40/593 |
| 6,840,639 B2 * | 1/2005 | Zadro | | 359/855 |
| 6,886,792 B2 * | 5/2005 | Immerman | | 248/206.3 |
| 7,162,281 B2 * | 1/2007 | Kim | | 455/575.1 |
| 7,172,164 B2 * | 2/2007 | Fuelling et al. | | 248/314 |
| D566,361 S * | 4/2008 | Snell | | D32/55 |
| D605,188 S * | 12/2009 | Martinez | | D14/253 |
| D625,130 S * | 10/2010 | Szczepanowski et al. | | D6/526 |
| D647,341 S * | 10/2011 | Micinilio | | D6/526 |
| 8,215,605 B1 * | 7/2012 | Shepley | | 248/558 |
| 8,333,353 B1 * | 12/2012 | Silverman et al. | | 248/205.6 |
| 2004/0047052 A1 * | 3/2004 | Zadro | | 359/855 |
| 2010/0019110 A1 * | 1/2010 | Shepley | | 248/206.5 |

* cited by examiner

*Primary Examiner* — Terrell McKinnon
*Assistant Examiner* — Daniel J Breslin
(74) *Attorney, Agent, or Firm* — Henry M. Feiereisen, LLC

(57) ABSTRACT

A device for supporting a part has a mounting element with a pocket-shaped receptacle and a suction element which supports the part and can be received in the pocket-shaped receptacle or removed from it and directly attached to the surface, so that in both cases the part is supported on the surface, either through the suction element and the mounting element or through the suction element only, and a width of at least a portion of the suction element is smaller than a width of the pocket-shaped receptacle of the mounting element, so that when the portion of the suction element is inserted into the pocket-shaped receptacle of the mounting element, it is compressed and thereby tightly retained in it.

5 Claims, 5 Drawing Sheets

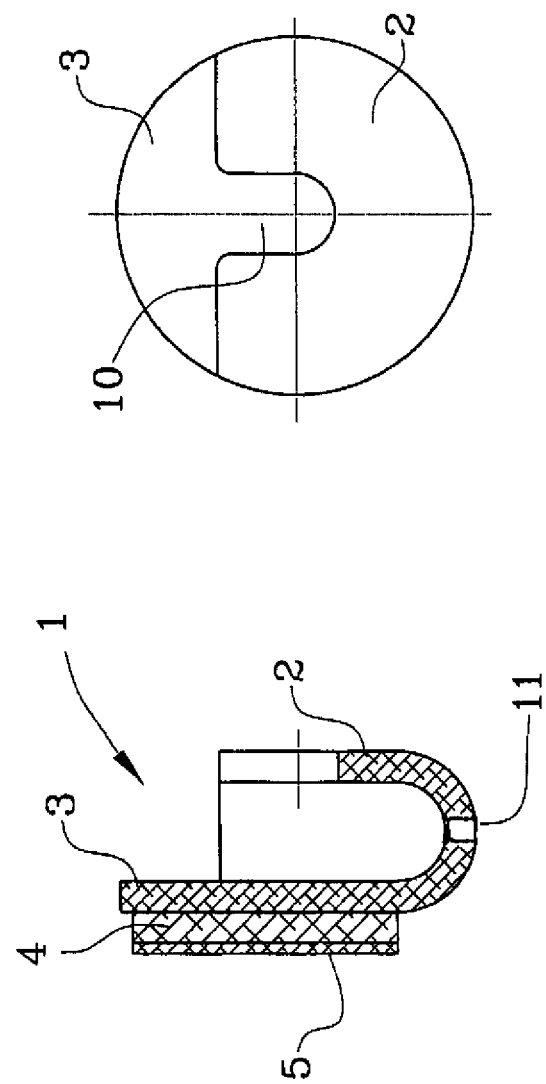

DEVICE FOR SUPPORTING A PART

CROSS REFERENCE TO A RELATED APPLICATION

This application is a continuation-in-part of patent application Ser. No. 12/800,406, filed on May 15, 2010, from which this continuation-in-part application claims its priority.

BACKGROUND OF THE INVENTION

The present invention relates to devices for supporting parts on a surface, for example parts, used for showering, bathing, and the like.

It is known to provide a supporting device which has a mounting member for holding a part and having a structure allowing the mounting member to be attached to a surface of a structure, so as to support the part. In some applications it is desirable to provide additional mounting possibilities for supporting the part on the surface, and therefore the mounting element can support a suction element which is separately attachable to a surface of the structure so as to support a part.

Some of the devices of this type are disclosed for example in published US patent applications US 2002/01622925, US 2004/0206867, US 2010/00191110. It is believed that the existing devices of this type can be further improved.

SUMMARY OF THE INVENTION

Accordingly, it is an object of the present invention to provide a device for supporting a part on a surface, which is a further improvement of the existing devices.

In keeping with these objects and with others which will become apparent hereinafter, one feature of the present invention resides, briefly stated, in a device for supporting a part, comprising a mounting element having a wall mountable on the surface and having a pocket-shaped receptacle, and a suction element which can be received in the pocket-shaped receptacle of the mounting element which is attachable to the surface or can be removed from the pocket-shaped receptacle and directed attached to the surface, so that in both cases the part is supported on the surface, either through the suction element and the mounting element or through the suction element only, wherein a width of the suction element or its portion is smaller than a width of the pocket-shaped receptacle of the mounting element, so that when the suction element or its portion is inserted into the pocket shaped receptacle of the mounting element, it is compressed and thereby tightly retained in the pocket-shaped receptacle of the mounting element.

In accordance with another feature of the present invention, the suction element has another portion which extends through an opening of the part, which is flexible, and which has a thickness that is greater than a size of the opening in the part, so that the other portion can be pushed through the opening with reduction its thickness and then expanded behind the part after passing through the opening to reliably hold the part on the suction element.

In accordance with a further feature of the present invention, the pocket-shaped receptacle of the mounting element is open at its upper side to allow insertion of the suction element into it and is closed at its lower side, with the exception of a through-going draining opening at the lower side to allow draining of water which can accumulate in the interior of the pocket-shaped receptacle of the mounting element The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view of a mounting element of the inventive device for supporting a part;

FIG. 2 is a front view of the mounting element of the inventive device;

DESCRIPTION OF THE PREFERRED EMBODIMENTS

Figure 3:
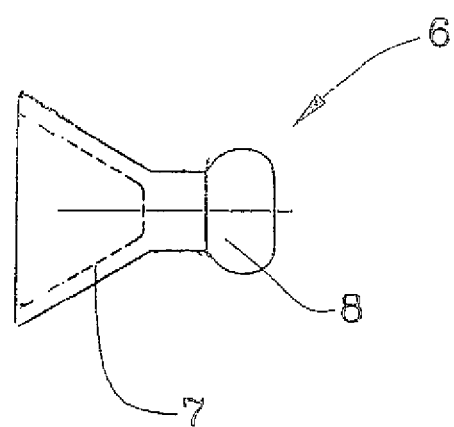
FIG. 3 is a side view of a suction element on the inventive device.

A device for supporting a part on a surface in accordance with the present invention includes a mounting element which is identified as a whole with reference numeral 1. The mounting element 1 can be formed for example as a substantially circular element having an axis. It has two walls 2 and 3 which are spaced from one another and in an axial direction and form a pocket-shaped receptacle therebetween.

Means for attaching the mounting element 1 to a surface is identified with reference numeral, and can be formed for example as an adhesive layer 4 provided on the wall 3 of the mounting element 1. In a non-used condition the adhesive layer 4 is covered by a protective layer 5 formed for example as a peelable off layer of paper, plastic and the like. For attaching the mounting element 1 to a surface, for example to a surface of the wall, the protective layer 5 is removed, and the wall 3 with the adhesive layer 4 is pressed against the wall to adhesively attach the mounting element to the surface.

The device for supporting a part in accordance with the present invention further has a suction element which is identified with reference numeral 6. The suction element 6 can be provided with a first part 7, which can be formed for example as an elastic part and possibly in a shape of an elastic cup, and also a projection 8 which is insertable into an opening of a part 9 to be supported and held in it. The projection 8 can pass through the opening of the part 9 because it is also elastic, and then engage the part 9 from the opposite side.

Figure 4:
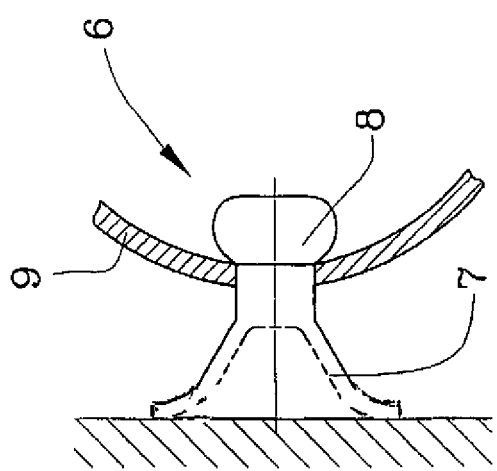
FIG. 4 is a side view of a suction element of the inventive device, inserted in the mounting element, and a part supported thereby.
Figure 6:
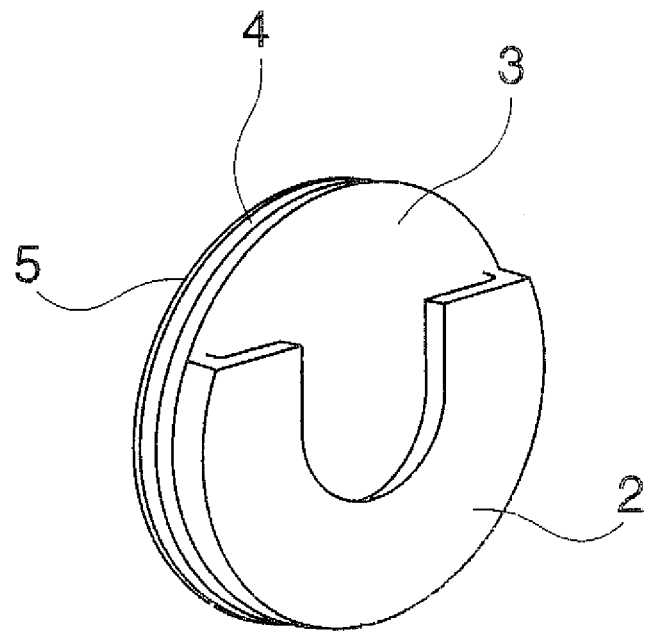
FIGS. 6 and 7 are perspective views of the mounting element and of the suction element of the inventive device.
Figure 7:
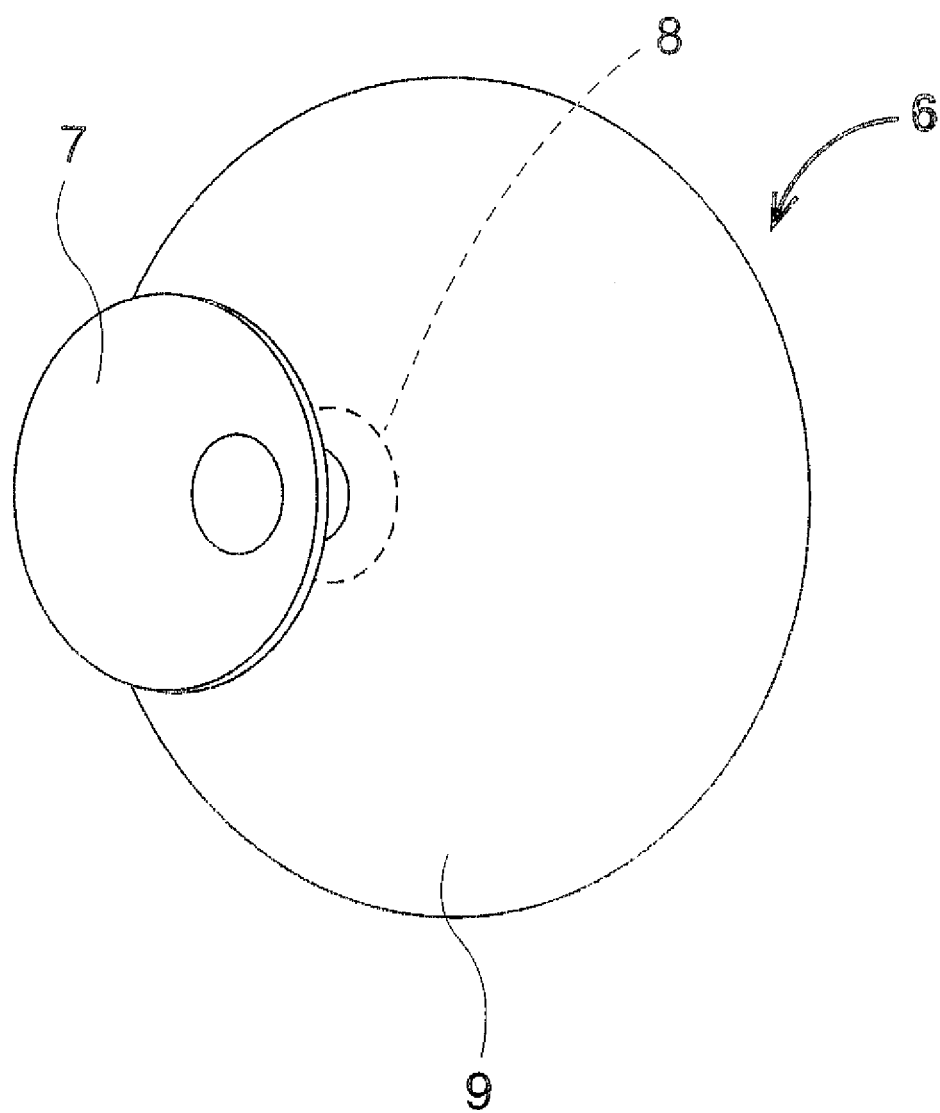

In various applications it is possible to press the suction element 6 against the surface so that the cup-shaped part 7 attaches with the suction action to the surface, and the suction element itself holds the part 9 on the surface. If however this is not possible or desirable in view of significant roughness of the surface and other considerations, the mounting element 1 is used for supporting the part 9. For this purpose the elastic part 7 of the suction element 6 is introduced into the pocket-shaped receptacle of the mounting element 1 and compressed because of its elastic properties to be reliably held in the receptacle. The assembly is then attached to the surface by interaction of the adhesive layer 4 with the surface as shown in FIG. 4.

As shown in FIG. 2, the mounting element 1 in its wall 2 is provided with a slot 10 through which the narrow portion of the elastic part 8 of the mounting member 6 can pass during insertion of the suction element 6 into the pocket-shaped receptacle of the mounting element 1. The slot 10 is substantially U-shaped.

The pocket-shaped receptacle is open at one radial side which is an upper side in FIG. 2, and is substantially closed at the other opposite radial side, which is a lower side in. At the lower side the mounting element 1 has a partially circumferential wall which extends over a certain angle around the axis of the mounting element 1.

In accordance with a very important feature of the present invention, when the elastic part 7 of the suction element 6 is introduced into the pocket-shaped receptacle of the mounting element 1 it is compressed. For this purpose the elastic part 7 of the suction element is compressible, in particular in the direction of an axis of the suction element 6. Also a width of the elastic part 7 of the suction element 6, in particular in its substantially axial direction, is smaller than a width of the pocket-shaped receptacle between the wall 2 and 3 of the mounting element 1. Thereby the elastic part 7 of the suction element 6 is compressed when the latter is inserted into the pocket-shaped receptacle of the mounting element 1, and the suction element 6 is reliably held in the mounting element 1.

Figure 5:
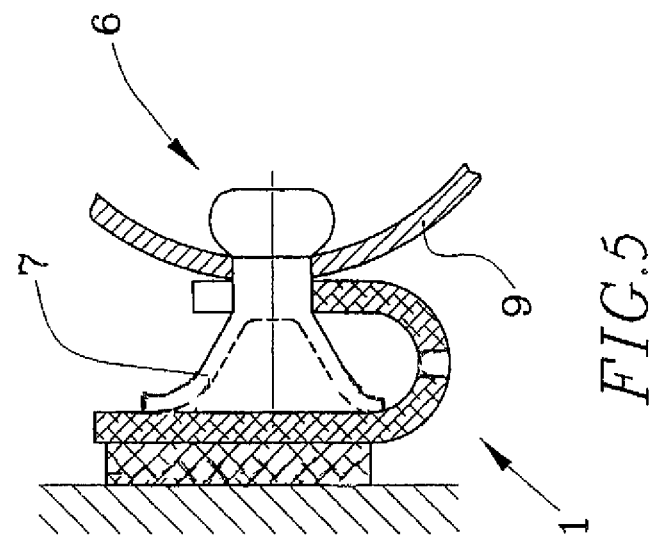
FIG. 5 is a front view of the inventive device shown in FIG. 3.

In accordance with another important feature of the present invention the projection 8 of the suction element 6 is flexible, in particular in a direction which is transverse or substantially perpendicular to the axis of the suction element 6. Moreover the projection 8 has a thickness in this transverse or perpendicular direction, which is greater than a transverse size of the opening in the part 9 in this transverse or perpendicular direction. Thereby when the suction element 6 is moved to the right in FIGS. 4 and 5 and the projection 8 is pushed through the opening in the part 9, the projection 8 is initially compressed transversely while passing through the opening, and thereafter it expands transversely when it emerges from the opening at the opposite side of the part 9, and the suction element 6 reliably holds the part 9.

In the suction element 6 the elastic part 7 and the projection 8 are therefore flexible and can be composed of any flexible or compressible material, for the purposes specified hereinabove. It is also possible that the whole suction element 6, including the elastic part 7, the projection 8, and the intermediate connecting portion, can be composed of a flexible or compressible material and formed as a one piece element of a single material.

In accordance with a further feature of the present invention, the mounting element is provided with a draining opening 11. In operation water can accumulate in the pocket-shaped receptacle between the walls 2 and 3 of the mounting element, since while a top part of the receptacle as considered in a direction transverse to an axis of the mounting element is open for insertion of the elastic part 7 of the suction element 6, its bottom part is closed by a substantially circular bottom which connects the walls with one another. In order to avoid accumulation of water in the pocket-shaped receptacle of the mounting element 1 the draining opening 11 can be provided, for example, in the substantially circular bottom of the pocket-shaped receptacle of the mounting element 1.

It will be understood that each of the elements described above, or two or more together, may also find a useful application in other types of constructions differing from the type described above.

While the invention has been illustrated and described as embodied in device for supporting a part, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

The invention claimed is:

1. A device for supporting a part, comprising a mounting element having a wall mountable on a surface and having a pocket-shaped receptacle; and a suction element which supports the part and can be received in the pocket-shaped receptacle of the mounting element mountable to the surface or can be removed from the pocket-shaped receptacle of the mounting element and directly attached to the surface, so that in both cases the part is supported on the surface, either through the suction element and the mounting element or through the suction element only, wherein a width of at least one portion of the suction element is smaller than a width of the pocket-shaped receptacle of the mounting element, so that when the at least one portion of the suction element is inserted into the pocket-shaped receptacle of the mounting element, it is compressed and thereby tightly retained in the pocket-shaped receptacle of the mounting element, wherein the suction element has another portion which extends through an opening of the part, is flexible, and has a thickness that is greater than a size of the opening of the part, so that the another portion can be pushed through the opening with reduction of its thickness and then expanded behind the part after passing through the opening to reliably hold the part on the suction element, and wherein the at least one portion and the another portion of the suction element are flexible and compressible and together form the suction element as a one piece element composed of a same material.

2. A device for supporting a part as defined in claim 1, wherein the suction element has an axis, and the one portion of the suction element is compressible in a direction of the axis, wherein the width of the one portion of the suction element is smaller than the width of the pocket-shaped receptacle of the mounting element as considered in a direction of the axis of the suction element.

3. A device for supporting a part as defined in claim 2, wherein the another portion of the suction element is flexible in a direction of the axis of the suction element.

4. A device for supporting a part as defined in claim 1, wherein the mounting element has a draining opening through which water accumulating in the pocket-shaped receptacle of the mounting element can drain outwardly.

5. A device for supporting a part as defined in claim 4, wherein the pocket-shaped receptacle of the mounting element is open at an upper side for insertion of the one portion of the suction element and is closed at a lower side by a bottom, wherein said draining opening is provided in the bottom.

* * * * *